United States Patent [19]
Kuryu

[11] Patent Number: 5,738,339
[45] Date of Patent: Apr. 14, 1998

[54] ROPE TRACTION DEVICE WITH CONNECTED LOCKING UNITS

[75] Inventor: Shizuka Kuryu, Tokyo, Japan

[73] Assignee: Nihon Biso Co., Ltd., Tokyo, Japan

[21] Appl. No.: 619,406

[22] Filed: Mar. 21, 1996

[30] Foreign Application Priority Data

Mar. 30, 1995 [JP] Japan ................................. 7-097853

[51] Int. Cl.⁶ ............................................... B66D 1/48
[52] U.S. Cl. ........................... 254/267; 254/333; 254/391; 188/65.1; 188/188; 182/234; 182/239
[58] Field of Search .......................... 254/267, 333, 254/382, 391; 182/239, 234, 192; 188/181 A, 188, 65.1

[56] References Cited

U.S. PATENT DOCUMENTS

| | | | |
|---|---|---|---|
| 2,922,623 | 1/1960 | Simmons | 188/65.1 |
| 3,438,423 | 4/1969 | Melull et al. | 254/333 X |
| 3,669,223 | 6/1972 | Arnold . | |
| 3,944,185 | 3/1976 | Evans . | |
| 3,968,865 | 7/1976 | McElroy | 188/188 |
| 3,980,161 | 9/1976 | Mauldin | 188/188 |
| 4,139,178 | 2/1979 | Hippach . | |
| 4,254,941 | 3/1981 | Tanson | 188/188 X |
| 4,729,456 | 3/1988 | Sugiyama | 188/188 X |
| 4,923,037 | 5/1990 | Stephenson et al. | 188/65.1 X |
| 5,228,540 | 7/1993 | Glaser | 188/188 X |

FOREIGN PATENT DOCUMENTS

| | | |
|---|---|---|
| 2213697 | 8/1974 | France . |
| 2640252 | 6/1990 | France . |
| 2142602 | 1/1985 | Germany . |
| 4328210 | 9/1994 | United Kingdom . |

*Primary Examiner*—Daniel P. Stodola
*Assistant Examiner*—Emmanuel M. Marcelo
*Attorney, Agent, or Firm*—Hedman, Gibson & Costigan

[57] ABSTRACT

A rope traction device has locking units that include a sheave on which a traction rope is wound. The rope traction device is adapted to be moved along with the traction rope and includes a traction rope inlet for feeding the traction rope to the sheave a traction rope outlet for feeding out the traction rope, a traction rope locking device for locking the traction rope when an increase in the speed of the traction rope is detected, and an auxiliary rope locking device provided in the vicinity of the traction rope inlet for detecting relative moving speed of an auxiliary rope suspended from the rope traction device. An interconnection is provided between the traction rope locking device and the auxiliary rope locking device in order to provide simultaneous engagement of the separate locking devices.

1 Claim, 9 Drawing Sheets

ROPE TRACTION DEVICE WITH CONNECTED LOCKING UNITS

BACKGROUND OF THE INVENTION

This invention relates to an improvement of a rope traction device used for winding instruments for construction, loading and unloading and conveying machines such as powered moving scaffolds, elevators and cranes. The invention is directed particularly to prevention of an accidental falling of a machine.

A rope traction device is a type of winding instrument used for construction, loading and unloading and conveying machines such as powered moving scaffolds, elevators and cranes and is capable of moving up and down along a traction rope with the traction rope wound around its sheave by only one or few windings and without winding the traction rope around a drum and feeding it therefrom.

Figure 7:
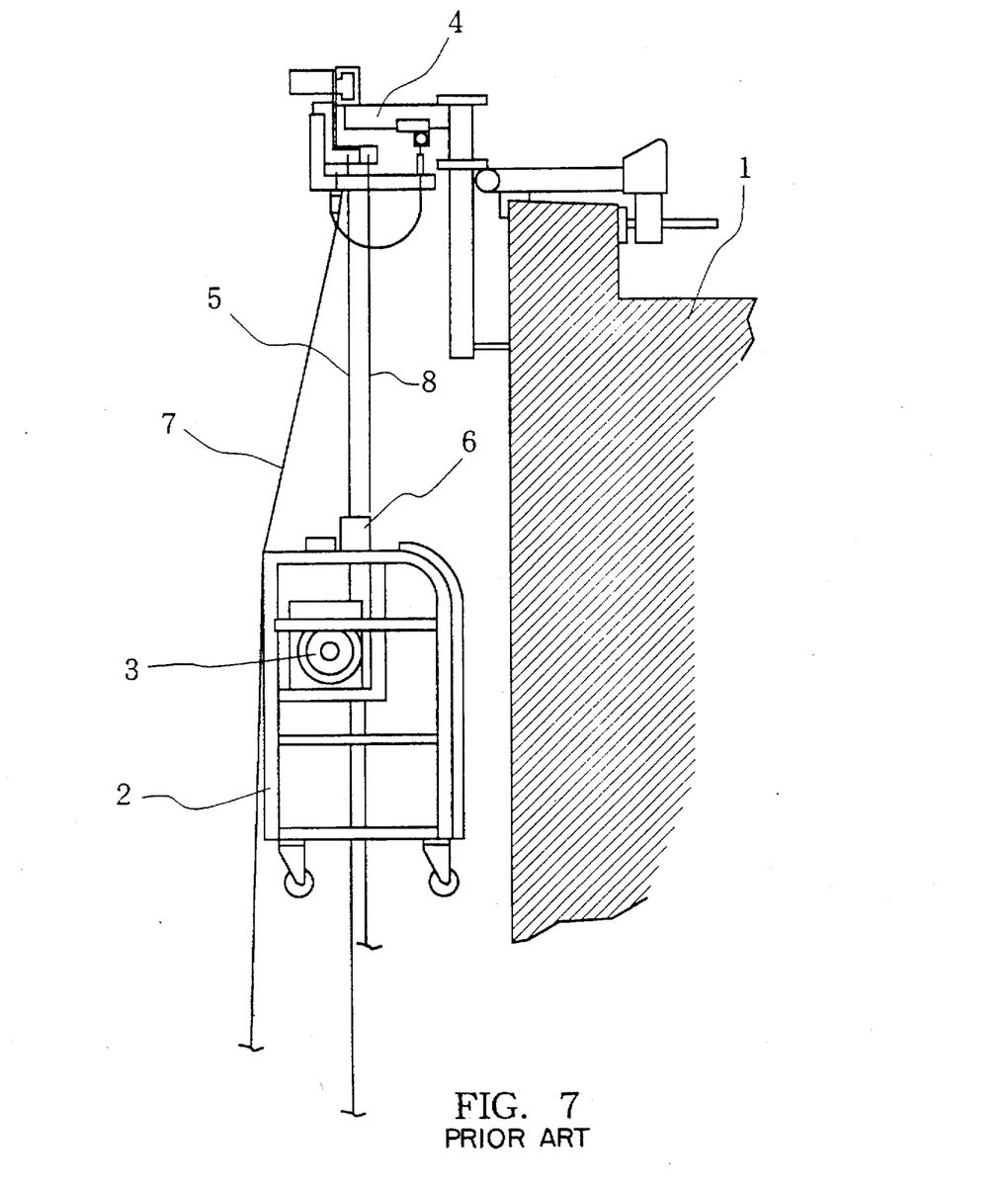
FIG. 7 is a view showing a moving scaffold in which a rope traction device is used.

An example of a prior art rope traction device used for moving up and down a moving scaffold for performing a work along an exterior wall surface of a building is shown in FIG. 7. This rope traction device 3 used for moving up and down a moving scaffold 2 is mounted on the moving scaffold 2. A traction rope 5 suspended from a frame 4 secured to a roof of a building 1 is inserted through the rope traction device 3 and the moving scaffold 2 is moved up and down along this traction rope 5.

Figure 8:
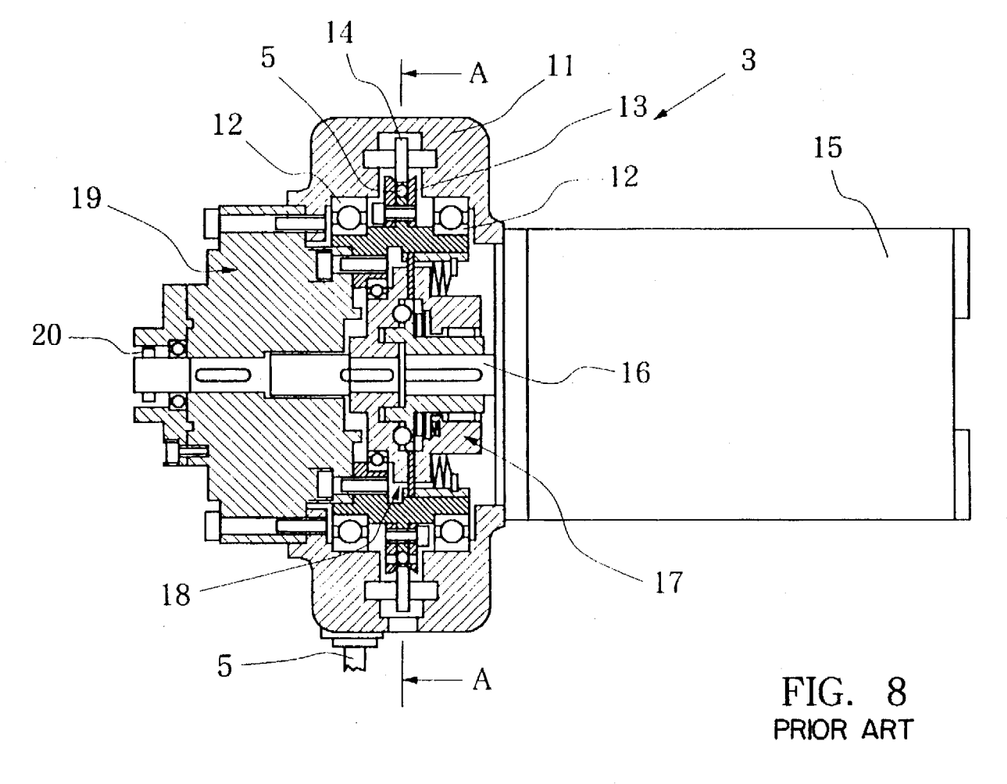
FIG. 8 is a vertical sectional view of a prior art rope traction device.
Figure 9:
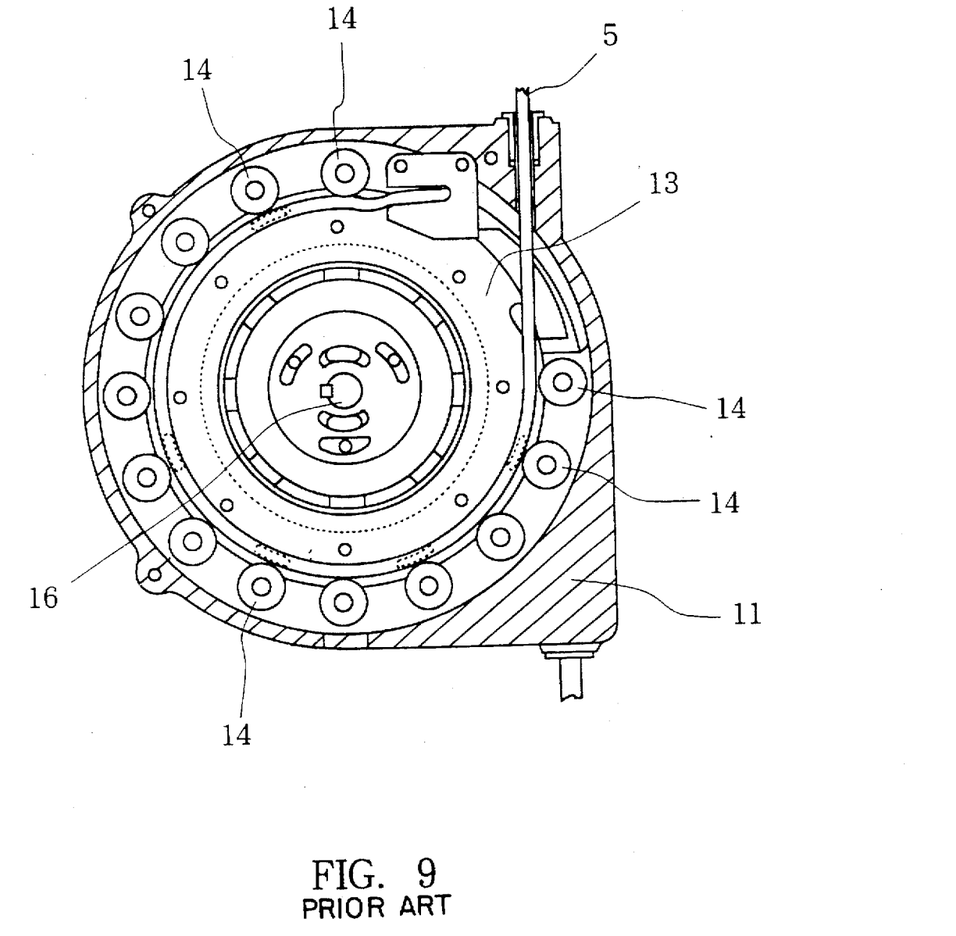
FIG. 9 is a cross sectional view of the prior art rope traction device.

As shown in FIG. 8 and FIG. 9 which is a sectional view taken along arrows A—A in FIG. 8, this rope traction device 3 includes a sheave 13 which is mounted on a frame 11 rotatably through a bearing 12. The sheave 13 has its groove portion made of leaf springs. A plurality of guide rollers 14 are mounted on the frame 11 along the sheave 13 and with a certain interval from the outer periphery of the sheave 13 in such a manner that these rollers 14 will press the traction rope 5 against the groove of the sheave 13 for preventing slippage of the traction rope 5. For driving this sheave 13, an electric motor having a brake is mounted on one side of the frame 11. A reduction gear 19 mounted on the other side of the frame 11 has its central input side connected to a drive shaft 16 of the motor 15 through a mechanical brake mechanism 17 and a clutch mechanism 18. The output side in the outer peripheral portion of the reduction gear 19 is connected integrally to the sheave 13.

Accordingly, as the sheave 13 is rotated by the motor 15, a traction force is applied to the traction rope 5 owing to friction between the traction rope 5 which is wound on the sheave 13 and the groove of the sheave 13 and the moving scaffold 2 is thereby moved up and down along the traction rope 5.

In the event of stoppage of electric current, the mechanical brake mechanism 17 which is released by action of electro-magnetic force during operation of the moving scaffold 2 is actuated for stopping the moving scaffold 2. An unillustrated handle is connected to a connecting section 20 formed on the input side of the central outside portion of the reduction gear 19 and the moving scaffold 2 can be moved up and down by manually operating the handle.

For doubly ensuring the safety of the moving scaffold 2, a locking device 6 is mounted on the moving scaffold 2 in a position above the rope traction device 3 and the traction rope 5 is led from the locking device 6 and inserted through the rope traction device 3. The relative moving speed of the traction rope 5 is detected and, upon increase of the relative moving speed above a certain upper limit value, the traction rope 5 is clamped by means of a pair of wedge members provided in the locking device 6 to lock the traction rope 5.

Further, a safety belt is attached to an operating person who performs a work on the moving scaffold 2 and a part of the safety belt is engaged with a safety rope 7 by means of an unillustrated engaging member. This engaging member is moved along the safety rope 7 in accordance with moving up and down of the moving scaffold 2 during the work of the operating person on the moving scaffold 2.

In actual performacne of work on the moving scaffold 2, however, work can be performed without using the locking device 6 notwithstanding that the traction rope 5 should be inserted through the rope traction device 3 through the locking device 6 and, therefore, there occurs a case where an operating person performs work on the moving scaffold 2 without using the locking device 6 and this is problematical from the standpoint of safety.

Moreover, in the prior art rope traction device 3, when it is intended to move up and down the moving scaffold 2 after the mechanical brake mechanism 17 is actuated due to stoppage of electric current, the moving scaffold 2 must be moved up and down by manually turning the handle connected to the connecting section 20 of the reduction gear 19. Since the reduction gear 19 has a large reduction ratio, a large number of turn of the handle is required for moving up and down the moving scaffold 2 with the result that tremendous time and labor are required for moving up and down the moving scaffold 2 in such case.

It is, therefore, an object of the invention to provide a rope traction device capable of securing safety by necessitating use of a locking device.

It is another object of the invention to provide a rope traction device capable of moving up and down a machine such as a moving scaffold quickly and at a minimum labor in the event that a brake is actuated due, for example, to stoppage of electric current.

SUMMARY OF THE INVENTION

For achieving these objects of the invention, a rope traction device according to the invention comprises a rope traction device having a sheave which is driven and rotated to cause a traction rope to be wound on the sheave and said rope traction device thereby moving along the traction rope, said rope traction device comprising a traction rope inlet for feeding in the traction rope, a traction rope outlet for feeding out the traction rope, traction rope locking means provided in the vicinity of said traction rope inlet for detecting increase in relative moving speed of the traction rope and thereupon locking the traction rope, auxiliary rope locking means provided in the vicinity of said traction rope inlet for detecting relative moving speed of an auxiliary rope suspended from above the rope traction device and thereupon locking the auxiliary rope, connecting means for connecting said traction rope locking means with said auxiliary rope locking means in such a manner that said traction rope locking means and said auxiliary rope locking means can detect increase in the relative moving speeds of the respective ropes independently from each other and both of said locking means are brought into a locking state when either one of said two locking means has detected increase in the relative moving speed.

According to the invention, the rope traction device cannot be operated unless the traction rope is inserted through the traction rope locking means and, accordingly, the traction rope locking means is necessarily used and safety of the rope traction device is thereby improved.

Further, since the auxiliary rope locking means is provided in addition to the traction rope locking means and the connecting means is also provided, the two locking means independently detect the relative moving speeds of the respective ropes and the two locking means are simultaneously brought into a locking state upon detection of increase in the relative moving speed of either one of the two ropes whereby safety of the rope traction device is further improved.

In one aspect of the invention, a rope traction device further comprises a motor connected to one end of said sheave through a reduction gear for driving and rotating said sheave, a brake mechanism connected to the other end of said sheave which is released in a normal operating state of said rope traction device to enable rotation of said sheave and is actuated in an emergency state to apply a braking force to stop rotation of said sheave, and a manual brake releasing mechanism connected operably to said brake mechanism for releasing said brake mechanism by a manual operation when said brake mechanism is actuated in the emergency state.

According to this aspect of the invention, in addition to the improvement in safety described above, the brake mechanism can be released by manual operation in an emergency state such as stoppage of electric current so that the brake mechanism can be released easily and a machine such as a moving scaffold can move down easily and quickly by utilizing its own weight.

Further, according to this aspect of the invention, the rope traction device in its entirely can be manufactured in a simple and compact design. Furthermore, since the brake mechanism is separated from the reduction gear, maintenance and adjustment of the device are facilitated. Moreover, since the shaft of the reduction gear is separated from the brake mechanism, the reduction gear and the brake mechanism can perform their functions independently from each other so that the safety of the rope traction device is improved as compared with the prior art rope traction device in which the reduction gear is provided integrally with the brake mechanism and therefore there is the danger that damage in a shaft of either of the reduction gear and the brake mechanism affects the other part.

In another aspect of the invention, there is provided a rope traction device having a sheave which is driven and rotated to cause a traction rope to be wound on the sheave and said rope traction device thereby moving along the traction rope, said rope traction device comprising a motor connected to one end of said sheave through a reduction gear for driving and rotating said sheave, a brake mechanism connected to the other end of said sheave which is released in a normal operating state of said rope traction device to enable rotation of said sheave and is actuated in an emergency state to apply a braking force to stop rotation of said sheave, and a manual brake releasing mechanism connected operably to said brake mechanism for releasing said brake mechanism by a manual operation when said brake mechanism is actuated in the emergency state.

A preferred embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
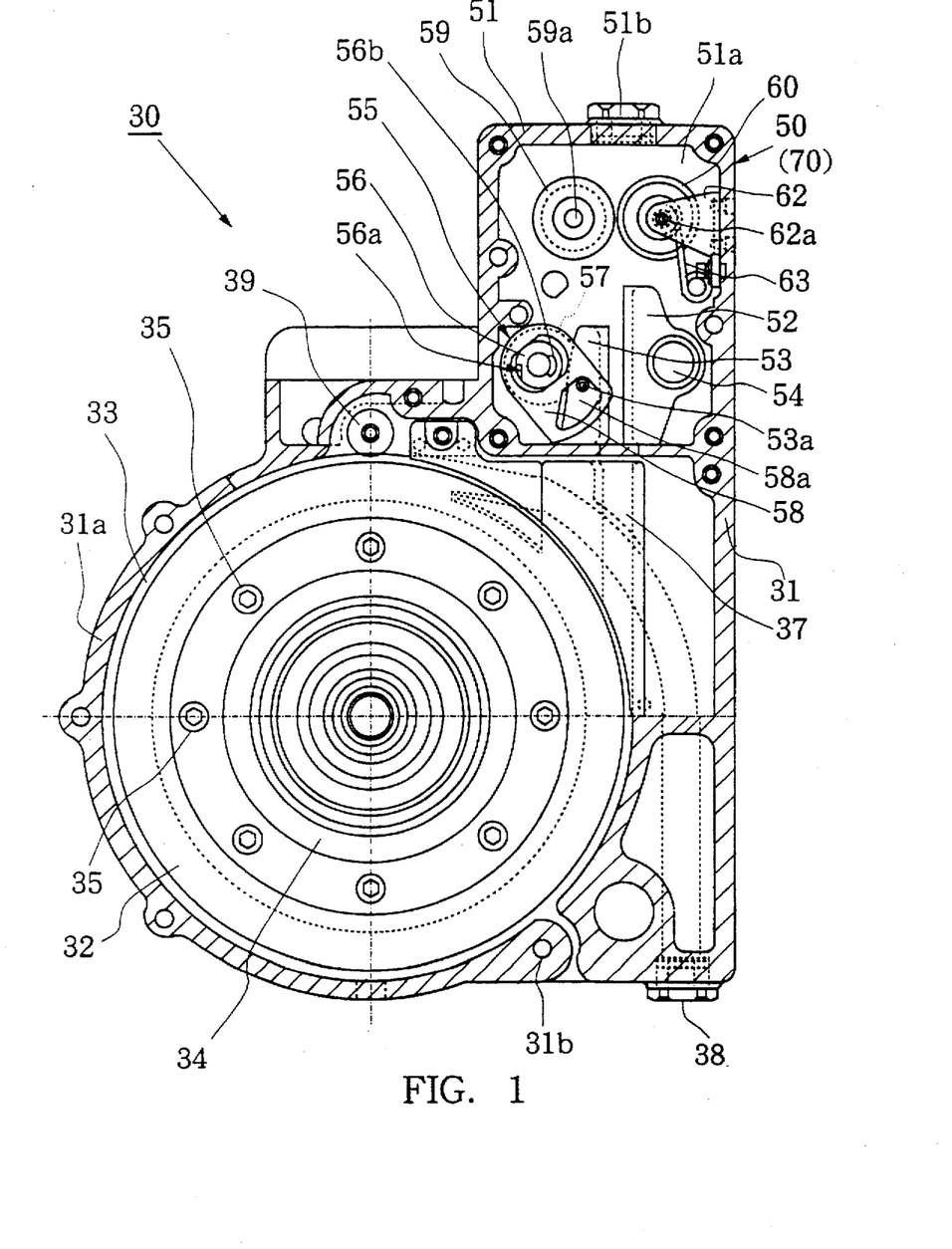
FIG. 1 is a cross sectional view showing an entire structure of an embodiment of the invention.
Figure 2:
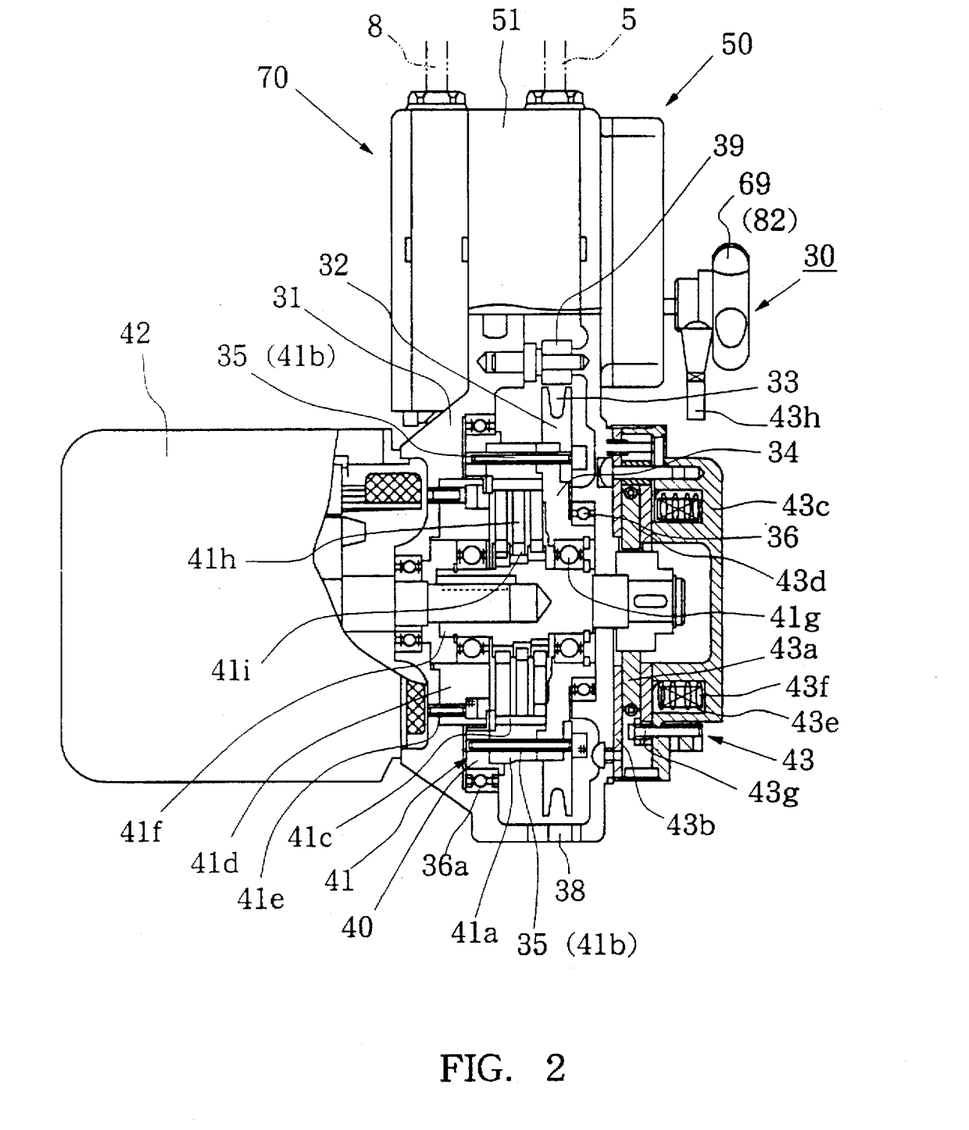
FIG. 2 is a vertical sectional view showing the same embodiment.

Referring to FIGS. 1 and 2 showing an entire structure of a preferred embodiment of the invention, a rope traction device 30 includes a sheave 32 housed therein. The sheave 32 has a rope insertion groove 33 formed in an outer peripheral portion thereof for winding a wire rope 5 which constitutes a traction rope thereon. This rope insertion groove 33 is formed in a substantially U-shaped cross section with its side wall surfaces being inclined outwardly by 5 degrees relative to perpendicular planes and the interval between the side wall surfaces of the U-shaped rope insertion groove 33 is made slightly smaller than the outer diameter of the wire rope 5. The sheave 32 is made of an elastic material such as SUS420J2 stainless steel.

According to this structure, when the wire rope 5 is wound on the sheave 32, the rope insertion groove is forced open and, owing to an elastic force caused thereby, frictional force is applied uniformly from the two sides of the groove 33 to the wire rope 5 whereby power is transmitted from the sheave 32 to the wire rope 5.

In an inner peripheral portion of the sheave 32 is provided a disk-like sheave holding member 34 which has a step portion which is fittedly engaged with a step portion formed in the inner peripheral portion of the sheave 32. The sheave holding member 34 is secured integrally to the sheave 32 by means of bolts 35.

By supporting this sheave holding member 34 on a frame 31 through a reduction gear 41 to be described later, the sheave 32 can be rotated. The reduction gear 41 is supported rotatably on the frame 31 through a bearing 36 and a bearing 36a.

A rope guide 37 is mounted on an upper corner portion of the frame 31 in which the tangential direction of the annular rope insertion groove 33 of the sheave 32 becomes vertical. A guide groove of this rope guide 37 is so formed that the wire rope 5 inserted from above is guided to the rope insertion groove 33 and, further, the wire rope 5 which has been wound by about 270 degrees about the rope insertion groove 33 is shifted by about 5 degrees in the axial direction of the sheave 32 and then is turned by about 90 degrees in the circumferential direction and guided to a wire rope outlet 38 formed in a lower end portion of the frame 31.

A guide roller 39 is rotatably mounted on the frame 31 at a position apposite to the tap portion of the sheave 32 so that the guide roller 39 presses the wire rope which has been wound nearly by one turn against the rope insertion groove 33.

For enabling inspection of the state of the wire rope 5 wound on the sheave 32 and the state of the rope insertion groove 33 from outside, as shown in FIG. 1, a side wall 31a which constitutes a portion of about 180 degrees of the outer peripheral portion of the frame 31 is pivotably supported on the frame 31 by means of a pin 31b. This side wall 31a can be fixed and opened by means of bolts.

For driving this sheave 32, a support frame 40 and a support frame 41a of the reduction gear 41 are fitted on and rotatably supported by the inner peripheral portion of the frame 31 through the bearing 36a. The support frames 40 and 41a constitute an output section of the reduction gear 41. The sheave holding member 34 which is integral with the sheave 32 is fixedly mounted by means of bolts 41b on the support frame 40 through the frame 41a of the reduction gear 41. A cylindrical shaft portion 41d of the reduction gear 41 is secured to the frame 31 by means of bolts 41e and a centrally located eccentric shaft 41f constitutes an input section of the reduction gear 41.

This eccentric shaft 41f is supported on the cylindrical shaft portion 41d and the sheave holding member 34. A curved plate 41h is mounted on the eccentric shaft 41f by means of a bearing 41i and the curved plate 41h is engaged with the frame 41a and the pin 41c.

Accordingly, as the eccentric shaft 41f of the reduction gear 41 is rotated, power is transmitted to the frame 41a and the sheave holding member 34 and the the sheave 32 is thereby rotated.

To the eccentric shaft 41f disposed in the central portions of the reduction gear 41 and the sheave holding member 34 is connected through a key an output shaft of an electric motor 42 which is secured to a side wall of the frame 31.

To the other end of the eccentric shaft 41f disposed in the central portion of the reduction gear 41 is connected a rotor 43a of a brake mechanism 43 mounted on the other side wall of the frame 31 in such a manner that the rotor 43a is rotated integrally with the eccentric shaft 41f and is located between a mounting flange 43b provided on the side of the frame 31 and an armature 43d fixed to a stator 43c.

In the stator 43c disposed outside of the armature 43d, there are provided torque springs 43e and electro-magnetic coils 43f equidistantly in the circumferential direction. The torque springs 43e constantly push the armature 43d forwardly and thereby causes the rotor 43a to be pressed to the mounting flange 43b provided on the side of the frame 31 and thereby apply a braking force. By supplying electric current to the electro-magnetic coils 43f, the armature 43d is pulled rearwardly (i.e., rightwardly as viewed in FIG. 2) and the brake thereby is released.

According to this brake mechanism 43, when it becomes impossible to supply electric current to the electro-magnetic coils 43f due to stoppage of electric current or other accidental causes, rotation of the sheave 32 is stopped and a work machine such as a moving scaffold thereby is stopped. For preventing this inconvenience, in this braking mechanism 43, a manually operated brake releasing mechanism is provided. More specifically, connecting pins 43g are provided in the outer peripheral portion of the armature 43d and these connecting pins 43g are connected to a manual operation lever 43h by means of a known link mechanism (not shown). By operating this manual operation lever 43h, the connecting pins 43g are pulled rearwardly (rightwardly as viewed in FIG. 2) and the armature 43d is thereby pulled rearwardly to release the brake.

In the rope traction device 30 of the above described structure, the wire rope 5 is inserted from the upper end portion of the frame 31 and is received in the rope insertion groove 33 of the sheave 32 through the rope guide 37. The wire rope 5 is then wound about the sheave 32 by about 270 degrees to the top portion of the sheave 32 and then is led to the rope guide 37 through the guide roller 39 and finally fed downwardly out of the wire rope outlet 38.

When the electric motor 42 is started in this state and electric current is supplied to the brake mechanism 43 to release the brake, the sheave 32 is driven and rotated through the reduction gear 41 and the wire rope 5 wound about the sheave 32 pushes the rope insertion groove 33 open thereby causing frictional force to be applied uniformly from the two side walls of the rope insertion groove 33 to the wire rope 5. As a result, power is transmitted from the sheave 32 to the wire rope 5 and the wire rope 5 is fed in and out of the sheave 32 and the work machine such as a moving scaffold is thereby moved up and down.

When the electric motor 42 is stopped and supply of electric current to the brake mechanism 43 is ceased to bring the mechanism to a braking state due to stoppage of electric current or other causes, the brake can be released by manually operating the manual operation lever 43h to pull the armature 43d off the rotor 43a. By releasing the braking force little by little by operation of the manual operation lever 43h, the work machine can fall smoothly but not too quickly utilizing its weight. Since the brake can be released by the manual operation of the lever, the work machine can move down more quickly than the work machine using the prior art rope traction device in which the input shaft of the reduction gear is rotated by the manually operated handle.

A locking device and an auxiliary locking device provided integrally with the rope traction device will now be described with reference to FIGS. 3 to 6.

Figures 3A, 3B:
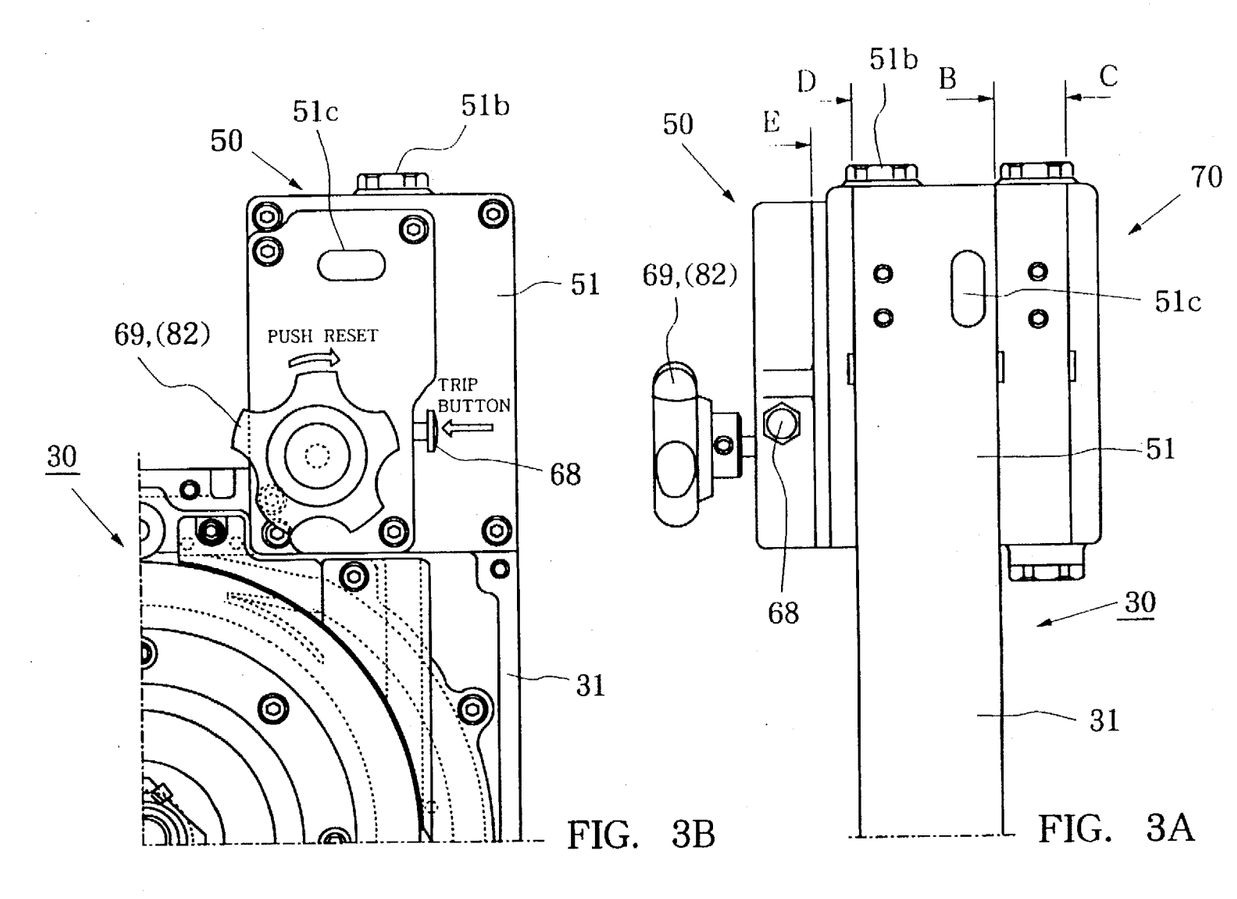
FIGS. 3A is a front view of a locking device of the rope traction device.
FIG. 3B is a side view of the locking device.

A locking device 50 and an auxiliary locking device 70 which are provided integrally with the rope traction device 30 are substantially of the same construction. It is a feature of these locking devices 50 and 70 that each locking device 50 or 70 detects an abnormality of relative moving speed of a wire rope independently from each other but when one of these locking devices 50 and 70 detects abnormality of the relative moving speed, the other locking device is automatically brought into a locking state in an interlocked motion with the one locking device which has detected the abnormality. Further resetting of these locking devices 50 and 70 is performed by means of a single common shaft.

The locking device 50 and the auxiliary locking device 70 are mounted in a case 51 which is formed integrally with the frame 31 in the upper portion thereof in the vicinity of a rope inlet 51b. In this case 51, there is provided a partition wall 51a to separate the case 51 in two sections. The locking device 50 is housed in one of the two sections and the auxiliary locking device 70 is housed in the other section.

Figure 4A:
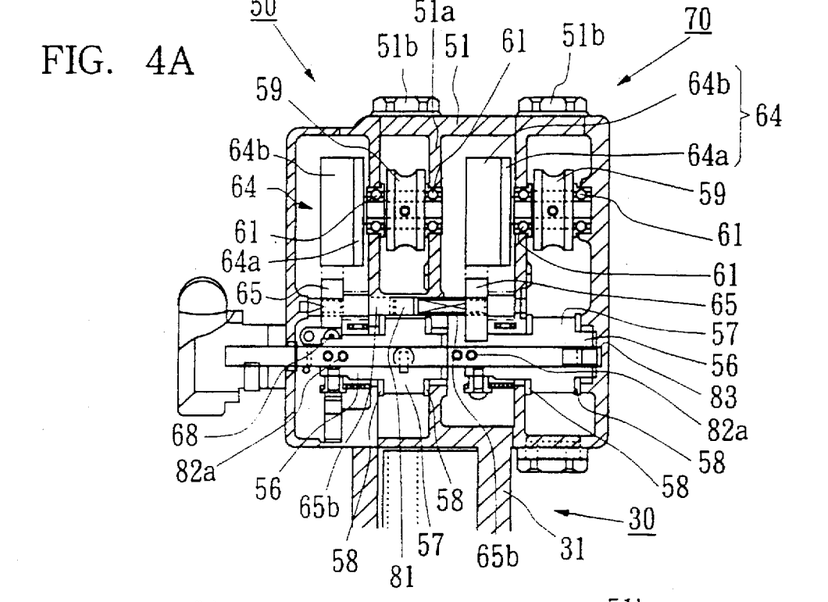
FIG. 4A is a vertical sectional view of the locking device.

In the locking device 50, in the lower portion of the case 51 are provided a pair of wedge members, i.e., a stationary side wedge member 52 and a moving side wedge member 53 across an extension line of a center line of the perpendicular guide groove of the rope guide 37 provided on the frame 31. Opposite surfaces of these stationary side wedge member 52 and the moving side wedge member 53 are respectively formed with grooves of a semi-circular cross section having a diameter which is slightly smaller than the outer diameter of the wire rope 5. The stationary side wedge member 52 is mounted in its central portion to the case 51 by means of a horizontal pin 54 about which the wedge member 52 is slightly pivotable.

On the other hand, the moving side wedge member 53 is provided in such a manner that it can be moved upwardly and toward the stationary wedge member 52 from its lowermost position by means of a cam mechanism 55. The rear surface of the wedge member 53 is formed in a taper the width of which increases toward the lower end thereof and is in abutting contact with a locking cam 57 mounted on a cam shaft 56. By this arrangement, as the locking cam 57 is rotated, the moving side wedge member 53 is moved upwardly and toward the stationary wedge member 52 and the wire rope 5 is thereby clamped and locked between the stationary side wedge member 52 and the moving side wedge member 53.

A pin 53a fixedly secured to the side surface of the moving side wedge member 53 is in abutting engagement with a wall of a guide groove 58a formed in guide plates 58 which are secured to either side of the locking cam 57. By rotating the locking cam 57 reversely from the locking position, the moving side wedge member 53 is moved downwardly and away from the wedge member 52 from the locking position to the lowermost position in which the wedge member 53 is seated on the bottom wall of the case 51 whereby the locking device 50 is brought to a reset state in which the wire rope 5 can run through the locking device 50 without being restricted thereby.

For enabling locking of the wire rope 5 automatically in accordance with increase in the relative moving speed of the wire rope 5, a pair of rollers 59 and 60 are disposed above the wedge members 52 and 53 in the case 51 in such a manner that these rollers 59 and 60 are in contact with the wire rope 5 and is rotated thereby. The roller 59 performs the function of a speed detection roller and is rotatably supported on the case case 51 through a bearing 61. The other roller 60 performs the function of a pressing roller and its shaft is rotatably and slidably supported in a groove 62a of a bracket 62 so that the pressing roller 80 can slide in the groove 62a toward the speed detection roller 59. The shaft of the pressing roller 60 is urged toward the speed detection roller 60 by a spring 63. A rubber lining is provided on the outer periphery of each of these rollers 59 and 60 which comes into contact with the wire rope 5 so as to ensure accurate detection of the moving speed of the wire rope 5 by the speed detection roller 59.

A governor 64 is mounted on a rotary shaft 59a of the speed detection roller 59. This governor 64 has a disk 64a which is fixedly secured to the rotary shaft 59a and rotated integrally with the rotary shaft 59a. A pair of oppositely disposed semi-circular weights 64b are pivotably mounted on the disk 64a. A radially outward pivoting movement of these semi-circular weights 64b due to centrifugal force is set and controlled by engagment of pins secured to the disk 64a with openings formed in the weights 64b and also by a coil spring 64c which connects the two weights 64b together.

When the relative moving speed of the wire rope 5 has exceeded a predetermined speed, the two weights 64b are pivoted radially outwardly about their pivoting pins.

A lever 65 having a rotary shaft 65b is pivotably supported on the case 51 in a manner to be operated by the radially outward movement of the weights 64b. The upper portion of the lever 65 is pushed by the weights 64b only during operation of the governor 64 and normally there is a gap between the lever 65 and the disk 64a and the outer periphery of the weights 64b.

An engaging portion 65a is formed in the lower portion of the lever 65 so that it can engage with an engaging portion 56a of the cam shaft 56 which is provided for moving the moving side wedge member 53. A locking spring 66 is provided between the case 51 and the cam shaft 56 for rotating the cam shaft 56 from a release state (reset state) in which the moving side wedge member 53 is withdrawn to a locking state in which the wedge member 53 is moved toward the wedge member 52. The engaging portion 65a of the lever 65 is engaged with the engaging portion 56a of the cam shaft 56 at a position at which the cam shaft 56 is rotated to a release position against the force of the locking spring 66. A spring 67 is provided on a rotary shaft of the lever 65 in a manner to urge the lever 65 in a direction in which the engagement of the engaging portion 65a of the lever 65 with the engaging portion 56a of the cam shaft 56 is maintained.

A trip rod 68 (FIGS. 3A and 3B and FIG. 4A) which extends from outside of the case 51 through an opening formed in the case 51 is disposed oppositely to a portion between the rotary shaft 65b and the engaging portion 68a of the lever 65. By pushing the trip rod 68, the engaging portion 65a of the lever 65 can be rotated out of engagement from the engaging portion 56a of the cam shaft 56.

For enabling the reset state of the locking device 50, the cam shaft 56 is made hollow and an engaging groove 56b of a fan-shaped cross section is formed in an axial direction of the hollow portion of the cam shaft 56. An operation rod 69 (FIG. 3) having a pin 69a (FIG. 6B) which can engage with the engaging groove 56b is provided from outside of the case 51 and the pin 69a of the operating rod 69 is engaged in the engaging groove 56b. By rotating the operation rod 69, the cam shaft 56 can be rotated against the force of the locking spring 66 and the engaging portion 65a of the lever 65 can thereby he engaged with the engaging portion 56a of the cam shaft 56 and the locking device 50 can thereby be brought to the reset state.

In the locking device 50 having the above described structure, the wire rope 5 is inserted into the locking device 50 from the rope insertion inlet 51b at the top of the case 51 in the reset state of the locking device 50. The wire rope 5 is then is inserted between the speed detection roller 59 and the pressing roller 60 and further between the stationary side wedge member 52 and the moving side wedge member 53 and guided from the bottom of the case 51 into the frame 31 of the rope traction device 30. The wire rope then is wound about the sheave 32 of the rope traction device 30 through the rope guide 37 and fed out of the wire rope outlet 38 at the bottom of the frame 31 and is suspended therefrom.

In this state, the wire rope 5 is clamped between the speed detection roller 59 and the pressing roller 60 and, as the wire rope 5 is moved, the two rollers 59 and 60 are rotated and the governor 64 thereby is rotated.

In a normal running state of the rope traction device 30, the weights 64b of the governor 64 which are pulled together by means of the spring 64c are not pivoted and the reset state of the locking device 50 is maintained. That is, the wire rope 5 runs through the locking device 50 without being restricted in its movement except that it rotates the speed detection roller 59 and the pressing roller 60.

In the event that the work machine such as a moving scaffold starts moving down at an abnormally high speed due to a disorder of the rope traction device 30 or other causes, the speed detection roller 59 to which the wire rope 5 is pressed by the force of the pressing roller 60 is rotated at a higher speed than a normal speed and the two weights 64b of the governor 64 which is rotated integrally with the speed detection roller 59 are pivoted radially outwardly due to centrifugal force against the force of the spring 64c and project outwardly of the periphery of the disk 64a to come into abutting engagement with the upper end portion of the lever 65.

The lever 65 is thereby rotated in a direction in which the engaging portion 65a thereof is disengaged from the engaging portion 56a of the cam shaft 56 and, therefore, restriction on rotation of the cam shaft 56 is now removed. The cam shaft 56 is therefore rotated by the force of the locking spring 66 which is connected to the cam shaft 56 and the locking cam 57 and the two guide plates 58 are also rotated.

The tapered rear surface of the moving side wedge member 53 is pushed toward the stationary wedge member 52 by the action of the locking cam 57 and the wedge member 53 is moved upwardly while it comes into contact with the wire rope 5. Owing to the wedging action caused by contact of the tapered rear surface of the wedge member 53 with the locking cam 57, the wire rope 5 is clamped tightly between the wedge members 52 and 53. Thus, the locking device 50 is brought into the locking state by clamping of the wire rope 5 between the wedge members 52 and 58 and the abnormal falling of the work machine is thereby stopped.

In a case where it is desired to release the locking device 50 from the locking state, the operation rod 69 is operated to insert its pin 69a into the engaging groove 56b of the cam shaft 56 and rotate the cam shaft 56 in a direction in which the moving side wedge member 53 is lowered and away from the stationary side wedge member 52 against the force of the locking spring 66. The engaging portion 65a of the lever 65 which is urged toward the cam shaft 56 by the force of the spring 67 is engaged with the engaging portion 56a of the cam shaft 56. The locking device 50 thereby is brought into the reset state to allow free movement of the wire rope 5.

In this rope traction device 30, for doubly ensuring safety, the auxiliary locking device 70 utilizing the auxiliary rope 8 suspended from, for example, the roof of a building or the like is provided in addition to the locking device 50 utilizing the wire rope 5 which constitutes the traction rope for moving up and down the work machine.

Since the basic structure of the auxiliary locking device 70 is the same as the one of the locking device 50, the same components of the auxiliary locking device 70 are designated by the same reference characters as those used for the locking device 50 and description therof will be omitted. For improving operability of these two locking devices 50 and 70, these locking devices 50 and 70 are interconnected by a connecting device 80 so that, notwithstanding that abnormality of the relative moving speeds of the wire rope 5 and the auxiliary wire rope 8 is detected independently by the locking device 50 and the auxiliary locking device 70, one of the locking devices 50 and 70 is brought to the locking state when the other is brought to the locking state and also is brought to the reset state when the other is brought to the reset state.

The auxiliary locking device 70 is disposed symmetrically to the locking device 50 across the partition wall 51a of the case 51 which is integral with the frame 31 of the rope traction device 30. The respective components of the auxiliary locking device 70 are disposed at the same position in the device 70 as those of the components of the locking device 50. Since the wire rope to be locked is the auxiliary wire rope 8, a part of the case 51 below the part where the auxiliary locking device 70 is disposed has no rope traction device but the wire rope 8 is used in a suspended state without being inserted through the rope traction device 30.

Figure 4B:
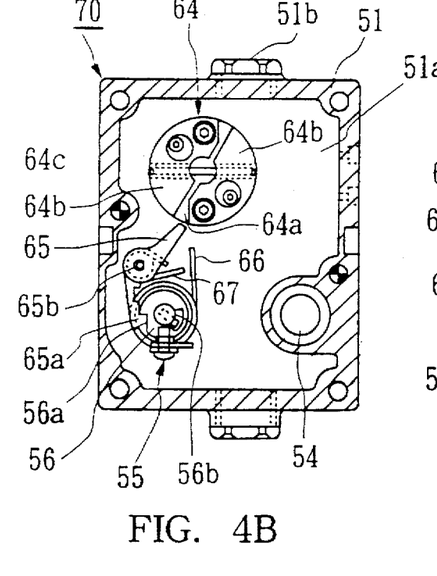
FIG. 4B is a sectional view taken along an arrow B in FIG. 3A.
Figure 4C:
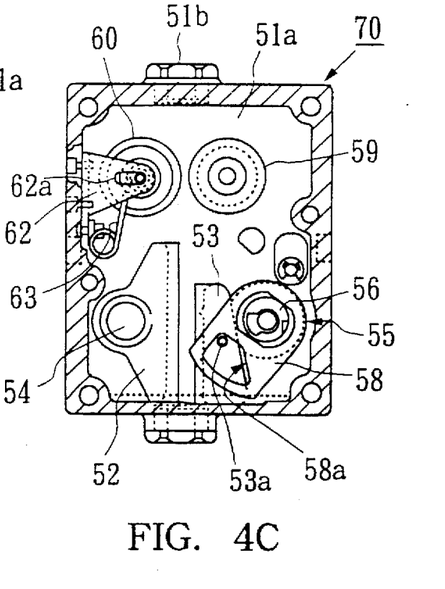
FIG. 4C is a sectional view taken alone an arrow C in FIG. 3A.
Figure 5A:
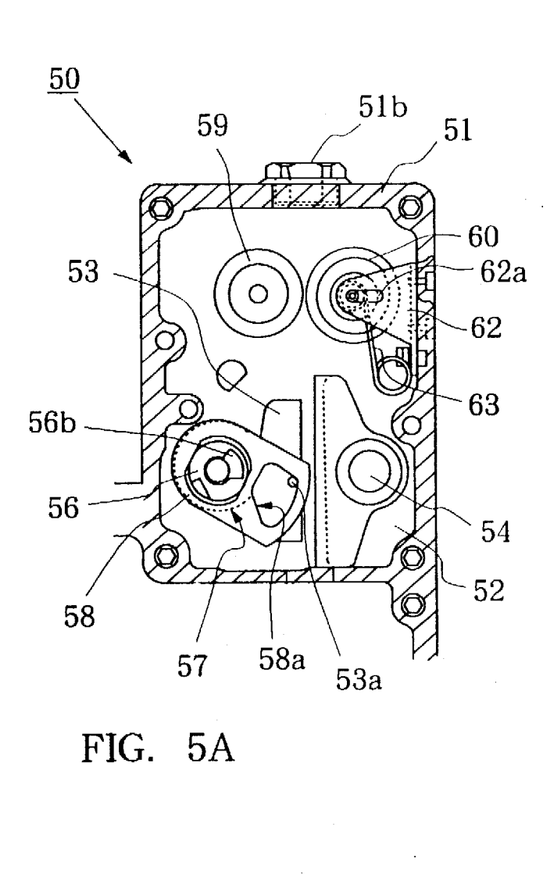
FIG. 5A is a sectional view of the locking device taken along an arrow D in FIG. 3A in a locking state.
Figure 5B:
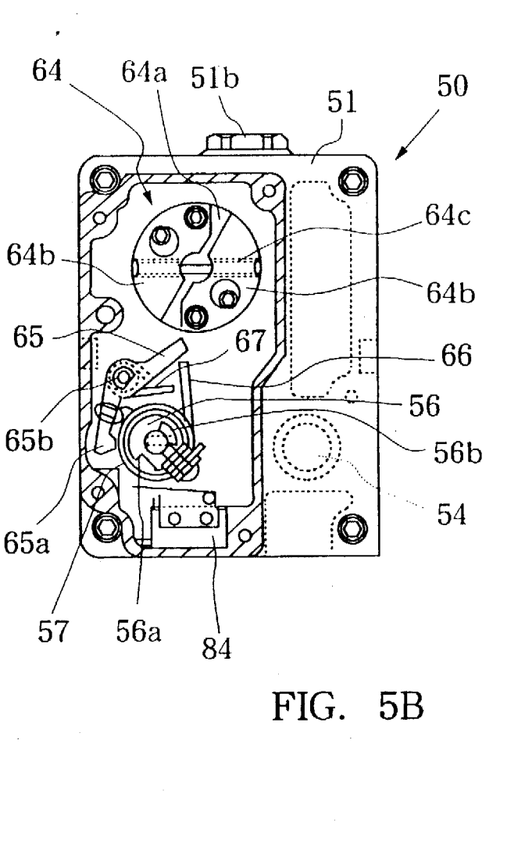
FIG. 5B is a sectional view of the locking device taken along an arrow E in FIG. 3A in a locking state.
Figure 6A:
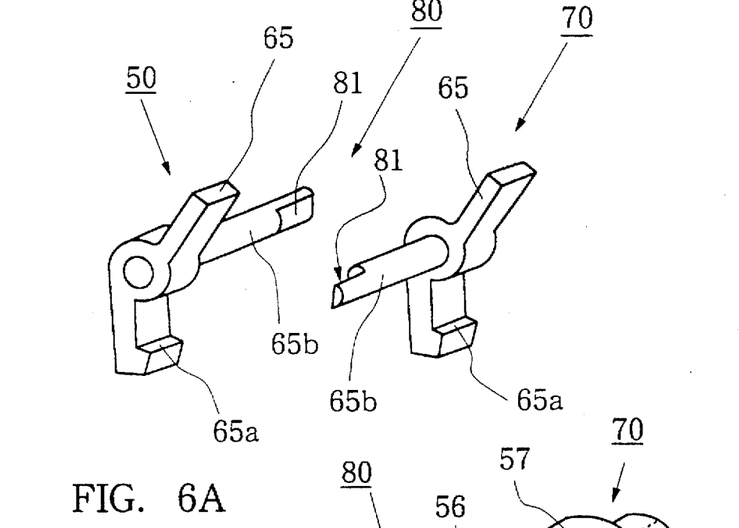
FIGS. 6A and 6B are exploded perspective views showing a connecting device for the locking device.
Figure 6B:
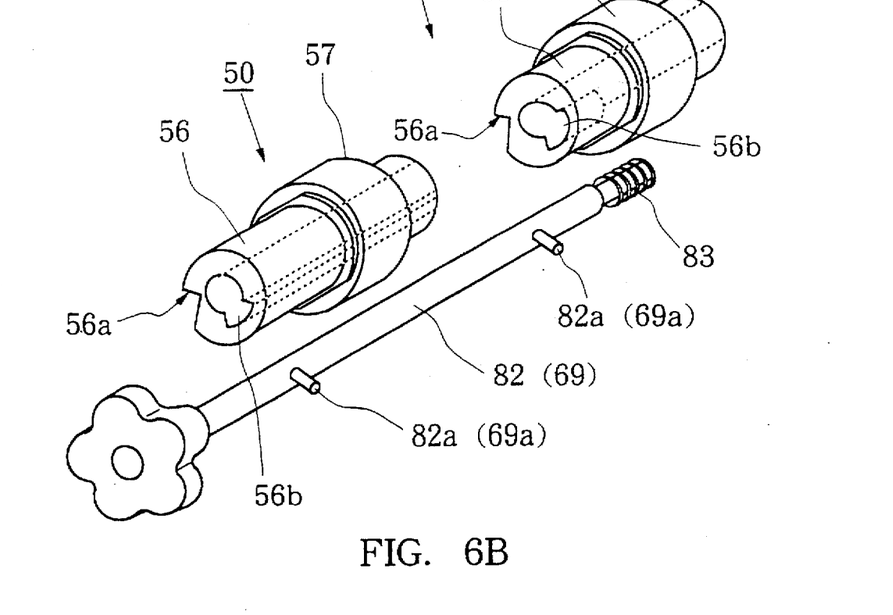

The connecting device 80 connecting the locking device 50 and the auxiliary locking device 70 together includes, as shown in FIGS. 4 to 6, the rotary shafts 65b of the levers 65 of the devices 50 and 70 which have recessed portions 81 of a semi-circular cross section on opposite sides at end portions remote from the levers 65. The levers 65 are mounted in the case 51 with their recessed portions 81 being in fitting engagement with each other. By this arrangement, the governors 64 of the respective locking devices 50 and 70 are interlocked to each other and operation of one of the governors 64 to bring one of the locking devices 50 and 70 into the locking state results in operation of the other governor 64 to bring the other locking device into the locking state.

Thus, abnormality in the relative moving speed of the wire rope 5 is detected by the speed detection roller 59 of the locking device 50 while abnormality in the relative moving speed of the auxiliary wire rope 8 is detected by the speed detection roller 59 of the auxiliary locking device 70, so that the locking device 50 and the auxiliary locking device 70 can detect abnormality of the wire rope 5 and the auxiliary wire rope 8 independently from each other.

In the event that a disorder has taken place in either one of the speed detection rollers 59 of the locking device 50 and the auxiliary locking device 70 so that only one of the speed detection rollers 59 performs its function, rotation of one of the levers 65 of the two devices 50 and 70 which are interlocked through the recessed portions 81 of the connecting device 80 is transmitted to the other lever 65 of the other locking device 50 or 70 and, accordingly, the engaging portions 65a of the two levers 65 are disengaged from the engaging portions 56a of the cam shafts 56 and, by rotation of the cam shafts 56 by the action of the locking springs 66, both of the locking device 50 and the auxiliary locking device 70 are brought into the locking state.

In a case where it is desired to bring the locking device 50 and the auxiliary locking devices 70 to the locking state for other purpose than detection of abnormality in the relative moving speed of the wire ropes 5 and 8, e.g., in a case where the device should be checked for maintenance, the trip rod 68 provided on the locking devices 50 and 70 is operated to rotate the levers 65 and the locking device 50 and the auxiliary locking device 70 are both brought to the locking state through the connecting device 80.

For resetting both the locking device 50 and the auxiliary locking device 70 from the locking state, the two locking devices 50 and 70 are interlocked to each other through the connecting device 80 for eliminating a troublesome operation for resetting the two locking devices 50 and 70 independently.

Resetting of the locking device 50 is made by inserting the pin 69a of the operation rod 69 into the engaging groove 56b of the cam shaft 56 and rotating the operation lever 69. For resetting, in the connecting device 80, the engaging groove 56b of the fan-shaped cross section of the locking device 50 is formed in the axial direction along the entire length of the cam shaft 56 whereas the engaging groove 56b of the fan-shaped cross section of the locking device 70 is formed in the axial direction along a part of the length of the cam shaft 56 as shown in FIG. 6B. An operation rod 82 for rotating the cam shafts 56 through the engaging grooves 56b is formed as a single elongated rod with two pins 82a provided at positions at which the two pins 82a can engage with the two engaging grooves 56b of the cam shafts 56.

This operation rod 82 is mounted on the case 51 in such a manner that it can slide in its axial direction and is urged by a spring 83 provided at the foremost end portion thereof in a direction in which the operation rod 82 is pushed outwardly. An arrangement is made so that, in a position in which the operation rod 82 is pushed fully outwardly by the spring 83, the pins 82a are out of engagement with the engaging grooves 56b of the cam shafts 56.

Accordingly, by rotating the operation rod 82 in a state in which the operation rod 82 is pushed into the case 51 against the force of the spring 83 with the two pins 82a engaged in the engaging grooves 56b of the cam shafts 56, the cam shafts 56 of both the locking device 50 and the auxiliary locking device 70 can be rotated simultaneously to bring both the locking devices 50 and 70 to the reset state.

The connecting device 80 thus enables detection of abnormality in the relative moving speed in one of the locking devices 50 and 70 to bring the two locking devices 50 and 70 to the locking state in an interlocked motion and also enables resetting of the two locking devices 50 and 70 simultaneously in an interlocked motion. Therefore, safety can be ensured and operability of the rope traction device can be enhanced as compared with a case where merely two locking devices are provided.

Since the speed detection rollers 59 are rotated by their contact with the wire ropes 5 and 8 in these locking devices 80 and 70, the automatic locking cannot be realized in a case where neither one of the speed detection rollers 59 is rotated. For preventing such accident, a window 51c is formed in the case 51 so as to enable checking of the locking devices 50 and 70 from outside.

In the locking device 50, a limit switch 84 (FIG. 5A) for electrically detecting the locking state and the reset state depending upon the position of the lever 65 is provided on the bottom of the case 51 so as to stop supply of electric current to the electric motor 42 when the locking device 50 is brought to the locking state. Since the levers 65 are rotated in an interlocked motion owing to the connecting device 80, the limit switch 84 can detect the locking state of either one of locking devices 50 and 70 without fail when such locking state is achieved.

What is claimed is:

1. A rope traction device having a sheave (32) which is driven and rotated to cause a traction rope (5) to be wound on the sheave and said rope traction device thereby moving along the traction rope, said rope traction device comprising:

a traction rope inlet (51b) for feeding in the traction rope;

a traction rope outlet (38) for feeding out the traction rope;

traction rope locking means (50) provided in the vicinity of said traction rope inlet (51b) for detecting increase in relative moving speed of the traction rope (5) and thereupon locking the traction rope;.

auxiliary rope locking means (70) provided in the vicinity of said traction rope inlet for detecting relative moving speed of an auxiliary rode (8) suspended from above the rope traction device and thereupon locking the auxiliary rope;

connecting means (80) connecting said traction rope locking means (50) with said auxiliary rope locking means (70) in such a manner that said traction rope locking means is adapted to detect an increase in the relative moving speeds of the respective ropes independently from each other and both of said locking means are brought to a locking state when either one of said locking means has detected increase in the relative moving speed; wherein each of said traction rope locking means and said auxiliary rope locking means comprises:

a case (51);

a speed detection roller (59) having a rotary shaft (59a) and being rotatably supported on such case (51), said speed detection roller being rotated by said traction rope or said auxiliary rope;

a governor (64) mounted on said rotary shaft of said speed detection roller (59) and having a weight (64b) which is pivotably supported on said governor and is pivoted radially outwardly when the relative moving speed of said traction rope (5) or said auxiliary rope (8) has exceeded a predetermined value;

a lever (65) having a rotary shaft (65b) being rotatably supported on said case (51) with one end portion thereof becoming engaged by said weight (64b) of said governor when said weight is rotated radially outwardly and the other end portion thereof having an engaging portion (65a);

a cam shaft (56) being rotatably supported on said case and having an engaging portion (56a) with which said engaging portion (65a) of said lever (65) can be engaged when said lever is rotated by said weight (64b);

a stationary wedge member (52) provided below said speed detection roller (59);

a movable wedge member (53) provided below said speed detection roller (59) and having a cam surface which is in contact with said cam shaft (56), said movable wedge member (53) being moved toward said stationary wedge member (52) when said cam shaft (56), is rotated by said lever (65), said traction rope or said auxiliary rope running between said stationary wedge member and said movable wedge member when said movable wedge member is not moved toward said stationary wedge member and being clamped and locked by said movable wedge member and said stationary wedge member when said movable wedge member is moved toward said stationary member; and said connecting means (80) comprises:

engaging portion (81) provided in opposite end portion of said rotary shafts (65b) of said levers (65) in said traction rope locking means (50) and said auxiliary rode locking means (70), wherein said connecting means further comprises:

an axially extending groove formed in each of said cam shafts (56) of said traction rope locking means (50) and said auxiliary rope locking means (70); and an operation rod (82, 69) mounted on said case (51) axially slidably and having a length extending though the cam shafts (56) and also having pins (82a, 69a) which can engage with said grooves (56b) of said locking means (50, 70); and spring means for urging said operation rod (82, 69) in a direction in which said pins (82a, 69a) of said operation rod are out of engagement with said grooves (56b), said pins (82a, 69a) being out of engagement with said grooves (56b) of said cam shafts (56) when said operation rod (82) is not operated and said pins are engaged with said grooves when said operation rod is operated whereby cam shafts can be rotated by operating said operating shaft for bringing said traction rope locking means (50) and said auxiliary rope locking means (70) to a reset state simultaneously.

* * * * *